United States Patent
Chandramouli et al.

(10) Patent No.: US 12,058,085 B2
(45) Date of Patent: Aug. 6, 2024

(54) DYNAMIC HIERARCHICAL/MULTI-LEVEL HIERARCHICAL CONTENT NAVIGATION CHATBOT

(71) Applicant: PwC Product Sales LLC, New York, NY (US)

(72) Inventors: Dushyanthkumar Chandramouli, Seattle, WA (US); Joshua Macha, Rochester Hills, MI (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/110,776

(22) Filed: Feb. 16, 2023

(65) Prior Publication Data
US 2023/0379274 A1 Nov. 23, 2023

Related U.S. Application Data

(60) Provisional application No. 63/343,388, filed on May 18, 2022.

(51) Int. Cl.
| | | |
|---|---|---|
| *H04L 51/02* | (2022.01) | |
| *G06F 3/0482* | (2013.01) | |
| *G06F 16/954* | (2019.01) | |
| *G06F 16/955* | (2019.01) | |

(52) U.S. Cl.
CPC ............ *H04L 51/02* (2013.01); *G06F 3/0482* (2013.01); *G06F 16/954* (2019.01); *G06F 16/9566* (2019.01)

(58) Field of Classification Search
CPC ..... H04L 51/02; H04L 16/954; H04L 3/0482; G06F 16/9566; G06F 16/954; G06F 3/0482

USPC .......................................................... 709/206
See application file for complete search history.

(56) References Cited

U.S. PATENT DOCUMENTS

| | | | | |
|---|---|---|---|---|
| 10,417,249 | B1* | 9/2019 | Sadler | G06F 16/9535 |
| 10,976,904 | B2* | 4/2021 | Moran | G06F 3/04842 |
| 11,477,141 | B2* | 10/2022 | Gupta | G06N 20/00 |
| 2015/0154528 | A1* | 6/2015 | Kharraz Tavakol | G06Q 10/063114 705/2 |
| 2018/0300339 | A1* | 10/2018 | Landowski | H04L 51/02 |
| 2018/0300399 | A1* | 10/2018 | Blandin | G06N 5/022 |
| 2018/0302345 | A1* | 10/2018 | Landowski | G06Q 10/103 |
| 2018/0317064 | A1* | 11/2018 | Kim | H04W 4/23 |
| 2019/0036864 | A1* | 1/2019 | Reuss | H04W 12/108 |
| 2019/0180258 | A1* | 6/2019 | Amar | H04L 51/02 |
| 2020/0137002 | A1* | 4/2020 | Chavda | G06N 20/00 |
| 2020/0175430 | A1* | 6/2020 | Kochura | H04L 51/02 |
| 2020/0252205 | A1* | 8/2020 | Padmanabhan | G06F 9/466 |
| 2020/0327196 | A1* | 10/2020 | Sampat | G06N 20/00 |
| 2020/0341970 | A1* | 10/2020 | Rodrigues | H04L 51/02 |
| 2020/0356237 | A1* | 11/2020 | Moran | G06F 3/0481 |
| 2021/0203623 | A1* | 7/2021 | Zhou | G06F 40/20 |
| 2022/0075947 | A1* | 3/2022 | Swvigaradoss | G06F 40/289 |

(Continued)

*Primary Examiner* — Sargon N Nano
(74) *Attorney, Agent, or Firm* — Morrison & Foerster LLP

(57) ABSTRACT

Provided herein are methods and systems for generating a chatbot. In response to a user selection of a content repository, the method can include generating a hierarchy map based on the selected content repository, translating the hierarchy map into a series of chatbot prompts, and generating a chatbot based on the series of chatbot prompts. The chatbot can be configured to guide the user to selected content within the content repository.

14 Claims, 11 Drawing Sheets

(56) References Cited

U.S. PATENT DOCUMENTS

| | | | |
|---|---|---|---|
| 2022/0076283 A1* | 3/2022 | Oliveira | H04L 51/216 |
| 2022/0206867 A1* | 6/2022 | Parthasarathy | G06F 9/5072 |
| 2023/0020613 A1* | 1/2023 | Drory | H04M 3/5191 |

* cited by examiner

DYNAMIC HIERARCHICAL/MULTI-LEVEL HIERARCHICAL CONTENT NAVIGATION CHATBOT

CROSS REFERENCE TO RELATED APPLICATIONS

This application claims the benefit of U.S. Provisional Application No. 63/343,388, filed on May 18, 2022, the entire content of which is incorporated herein by reference.

FIELD OF THE DISCLOSURE

The present invention relates to systems and methods for generating a chatbot, and more specifically, to systems and methods for generating a chatbot to navigate a user to selected content within a content repository.

BACKGROUND OF THE DISCLOSURE

Content repositories, or content stores, are one data management system for storing digital content. Content repositories often store data according to a hierarchical logic structure such as a series of folders and sub-folders that organize data based on its content. This hierarchical logic structure is not unique to content repositories, as other types of data also use this structure. For example, certain procedures, code systems, and documents also rely on hierarchical logic structures to organize content in a hierarchical manner. In an increasingly digital world, the amount of digitized information available continues to increase. Beneficially, content repositories and other hierarchical data storage structures can store a large amount of information. However, the broader a content repository becomes, the more difficult it can be for a user to locate desired content.

When searching for specific content within a content repository, such as the World Wide Web or a folder directory, users can rely on a search bar. A user can input search terms such as keywords or phrases into a search bar, which returns a list of results related to those search terms. The user can then review the search results to identify the specific content they are searching for. Some search bars enable users to add filters to narrow the field of results, such as a filter to return only results created within a specified period or authored by a certain individual. Even with filtered search results, however, the user still must provide targeted search terms and manually review the results to identify results related to the user's desired content. Accordingly, there exists a need for a more accurate and less time-consuming manner for users to search content repositories for desired content.

SUMMARY OF THE DISCLOSURE

Described herein are system, method, and computer program product embodiments for dynamically generating a chatbot to guide a user to desired content within a content repository. In one or more examples, the user can select a content repository that they would like to search. Upon receiving the content repository selection, a hierarchy map of the content repository can be generated that demonstrates the relationships between data categories in the content repository. The hierarchy map can be used to generate a chatbot decision tree, which can translate the content repository into a decision-consequence tree based on the hierarchical data relationships of the content repository. The chatbot decision tree can be translated into stepwise dialogue prompts for a chatbot, which can be presented to the user. The chatbot can navigate the user to desired content within the content repository based on the user's selections of the stepwise dialogue prompts, without requiring the user to review a large number of search results or design targeted search prompts.

In one or more examples, a method for generating a chatbot can comprise: receiving a user selection of a content repository from a user, generating a hierarchy map based on the selected content repository, translating the hierarchy map into a series of chatbot prompts, and generating a chatbot based on the series of chatbot prompts, wherein the chatbot is configured to guide the user to selected content within the content repository.

Each of the series of chatbot prompts may comprise one or more selectable user input options. The method may comprise displaying a first chatbot prompt of the series of chatbot prompts to the user via the chatbot, receiving an input selection, the input selection executed by the user via the one or more selectable user input options, and displaying a second chatbot prompt of the series of chatbot prompts to the user via the chatbot, the second chatbot prompt based on the input selection. The one or more user input options can comprise an affordance that enables the user to select a link that directs the user to the selected topic. The one or more user input options may comprise an affordance that enables the user to navigate further within the selected topic. The one or more user input options can comprise an affordance that enables the user to navigate to a new topic within the content repository.

Generating a hierarchy map can comprise: accessing the selected content repository, identifying one or more root data nodes, identifying related child data nodes of each of the one or more root data nodes, and generating the hierarchy map based on the one or more root data nodes and the related child data nodes of each of the one or more root data nodes.

The method may comprise providing one or more launch options to the user to launch the chatbot. The one or more launch options can comprise a uniform resource locator (URL) that directs the user to the chatbot. The one or more launch options can comprise an affordance to launch the chatbot embedded within a website. The one or more launch options may comprise an affordance to launch the chatbot within an application.

The user can be a user type of a plurality of user types and the chatbot can be generated based in part on the user type of the user. The content repository may be one of a data tree, a decision tree, and a sectional document. The method may comprise displaying a timer to the user while generating the chatbot.

In one or more examples, a system for generating a chatbot can comprise: one or more processors coupled to one or more memory devices, wherein the one or more memory devices include instructions that when executed by the one or more processors cause the system to: receive a user selection of a content repository from a user, generate a hierarchy map based on the selected content repository, translate the hierarchy map into a series of chatbot prompts, and generate a chatbot based on the series of chatbot prompts, wherein the chatbot is configured to guide the user to selected content within the content repository.

In one or more examples, a computer-readable medium can stores instructions that when executed by a computing device, cause the computing device to: receive a user selection of a content repository from a user, generate a hierarchy map based on the selected content repository, translate the hierarchy map into a series of chatbot prompts, and generate a chatbot based on the series of chatbot prompts wherein the chatbot is configured to guide the user to selected content within the content repository.

Additional advantages will be readily apparent to those skilled in the art from the following detailed description. The aspects and descriptions herein are to be regarded as illustrative in nature and not restrictive. It will be appreciated that any of the variations, aspects, features, and options described in view of the systems apply equally to the methods and vice versa. It will also be clear that any one or more of the above variations, aspects, features, and options can be combined.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

The invention will now be described, by way of example only, with reference to the accompanying drawings, in which.

DETAILED DESCRIPTION OF THE DISCLOSURE

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Described below are systems, methods, apparatuses, and computer program product embodiments for dynamically generating an interactive chatbot based on a selected content repository. As explained above, there exists a need for systems and methods to search for digital material that are more accurate and less time-consuming than manually parsing through repositories or relying on existing search bars. The systems and methods disclosed herein improve upon current search methodologies by reimagining the search experience from a simple search bar to an interactive chatbot that can guide the user to their desired content based on the user's responses to stepwise chatbot prompts.

In one or more examples a user can select a particular content repository, such as a SharePoint, Confluence, or Google drive folder, a flow chart, etc. Upon receiving the selected content repository, a chatbot generator can generate a hierarchy map that specifies the hierarchical organizational structure of the data of the content repository, translate that hierarchy map into a series of chatbot prompts, and then generate a chatbot based on those prompts. When displayed to the user, the chatbot can provide prompts to the user sequentially, with each successive prompt based on the user's response to the prior prompt. In this manner, the chatbot can navigate the user through the content repository by way of the chatbot prompts and user selections to locate the content of interest within the content repository. Beneficially, the systems and methods described herein enable the user to navigate large data repositories and/or complex decision tree workflows (e.g., flow charts) in an interactive and straightforward manner.

Figure 1:
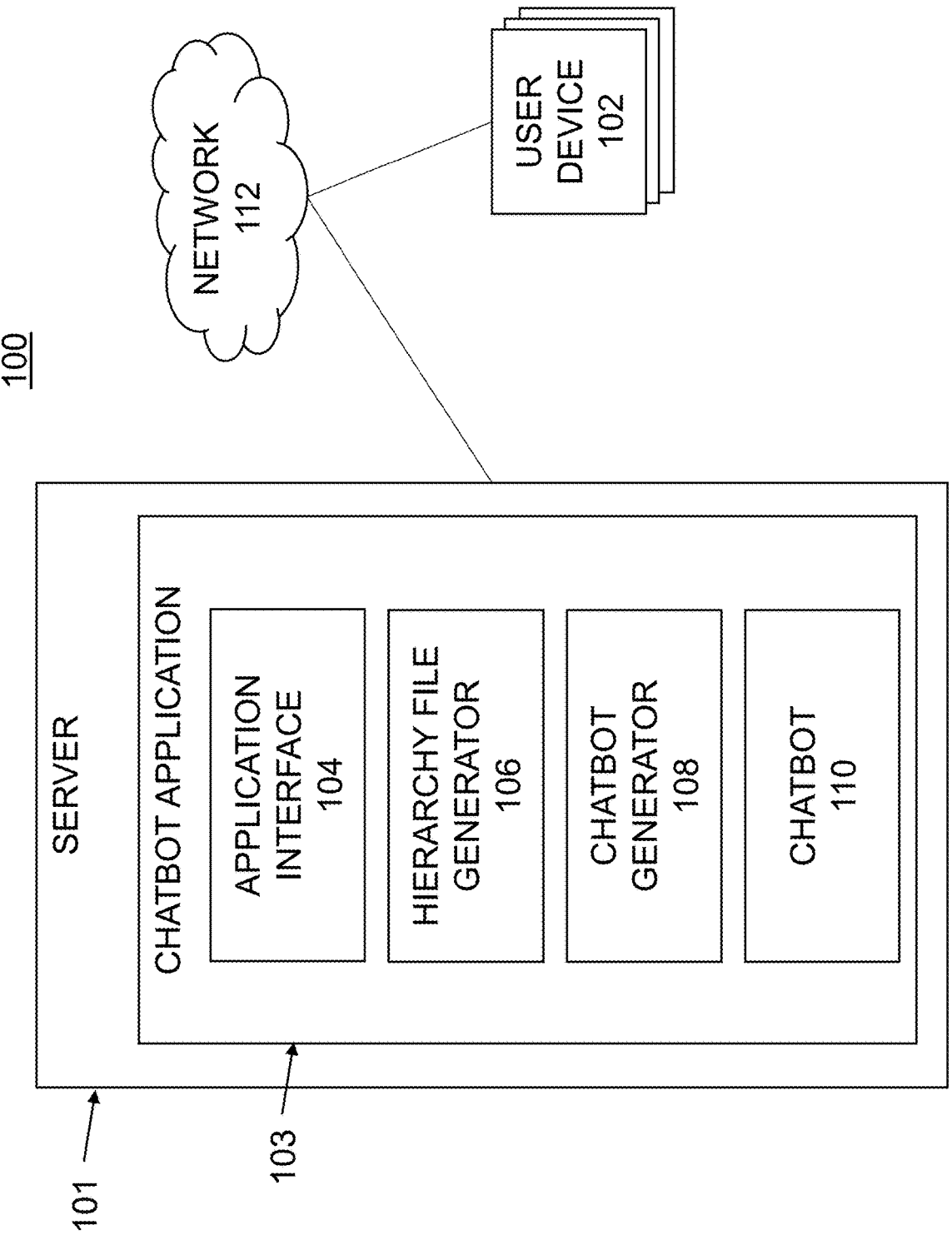
FIG. 1 shows an exemplary system for generating a chatbot, according to one or more examples of the disclosure.

FIG. 1 shows an exemplary system 100 for generating a chatbot, according to one or more examples of the disclosure. The system can include a server 101 and one or more user devices 102 connected to a network 112. Network 112 can include wired and/or wireless networks that span a wide area network (WAN) such as the Internet, an intranet, a local area network (LAN), a metropolitan area network (MAN), etc. Network 112 may use any of a plurality of communications standards, protocols, and technologies, including but not limited to Global System for Mobile Communications (GSM), Enhanced Data GSM Environment (EDGE), long term evolution (LTE), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Wi-MAX, etc.

As discussed above, individuals searching for specific content within a content repository can manually parse through content repositories to locate content or rely on existing systems such as search bars by inputting search criteria and manually reviewing results. Alternatively, a user operating, for example, one of user devices 102 can utilize a dynamic chatbot generator. The user device 102 can be computing devices capable of accessing network 112. For example, user devices 102 may include a workstation, a desktop computer, a laptop, a tablet, a mobile device such as a smartphone, etc.

In one or more examples, a user operating a user device 102 can utilize a chatbot application 103 to request and interact with a chatbot. The chatbot application 103 can be a software application that the user downloads from server 101 (e.g., a cloud server or a physical server), or that is stored on the server 101. When the chatbot application 103 is stored on the server 101, the user can access the chatbot application 103 using a client, such as a web browser (e.g., CHROME, IE, SAFARI, etc.) or a client application capable of interfacing with server 101 via network 112.

In one or more examples, as will be further described below, the chatbot application 103 can generate an interactive chatbot that improves upon current existing commercial search tools by generating a chatbot based on a specific content repository inputted by a user (e.g., dynamically generating a chatbot upon command) and interactively guiding the user to selected content via stepwise prompts displayed via the chatbot. By generating a chatbot upon command by a user, the chatbot can incorporate up to date information in the content repository. Accordingly, a chatbot generated based on a specific content repository at a first instance may differ from a chatbot generated based on the same content repository at a later instance if the information within the content repository has changed. In one or more examples, to generate an interactive chatbot, the chatbot application 103 can include various components such as an application interface 104, a hierarchy file generator 106, a chatbot generator 108, and a chatbot 110.

In one or more examples, the chatbot application 103 can receive inputs for generating the chatbot 110 via the application interface 104. Exemplary inputs the application interface 104 may receive can include a selection and/or input of a content source and one or more launch options. For instance, the application interface 104 can display one or more affordances to the user that enable the user to select a specific content repository. The user may specify, via the user device 102, a particular content source, such as SharePoint, Confluence, Google Drive, a flow chart, etc., and provide a content uniform record locator (URL). The application interface 104 can display one or more launch option affordances that enable the user to select, for example, how/where they want the chatbot to be generated. For instance, the user may select to launch the generated chatbot in an internet browser, as an embedded iFrame (inline frame), within an application such as Microsoft Teams, etc.

The inputs received via the application interface 104, can be relayed to the hierarchy file generator 106. In particular, the hierarchy file generator 106 can receive data corresponding to the particular content repository the user selected via the user device 102. The hierarchy file generator 106 can be configured to generate a hierarchy map based on the hierarchy of data of the selected content repository. As noted above, data can be stored in a hierarchical logic structure such as a series of folders and sub-folders that organize data based on its content. The hierarchy file generator 106 can be configured to access the selected content repository, extract the hierarchical information (e.g., the organization schema) of the content repository, and generate a hierarchy map based on the content repository. The hierarchy map indicates particular parent nodes (e.g., the top "folder" of a content repository), as well as all related child nodes of the parent nodes, and so on. In one or more examples, the hierarchy file generator 106 may require a private key to access the content repository. In such instances, the hierarchy file generator 106 may access a key vault to request the relevant private key and then supply that private key to access the content repository.

The chatbot generator 108 can translate the hierarchy map generated by the hierarchy file generator 106 into prompts for a chatbot and generate the chatbot 110. In one or more examples, the chatbot generator 108 can be configured to generate a chatbot decision tree based on the hierarchy map, and the chatbot decision tree can be used to generate the chatbot 110, as will be discussed below.

The chatbot 110 can display prompts based on data received from the chatbot generator 108. In one or more examples, the chatbot 110 displays prompts based on the chatbot decision tree generated by the chatbot generator 108. The chatbot 110 can interactively guide the user to specific content within the content repository by displaying specific prompts based on the selections made by the user via the user device 102.

Figure 2:
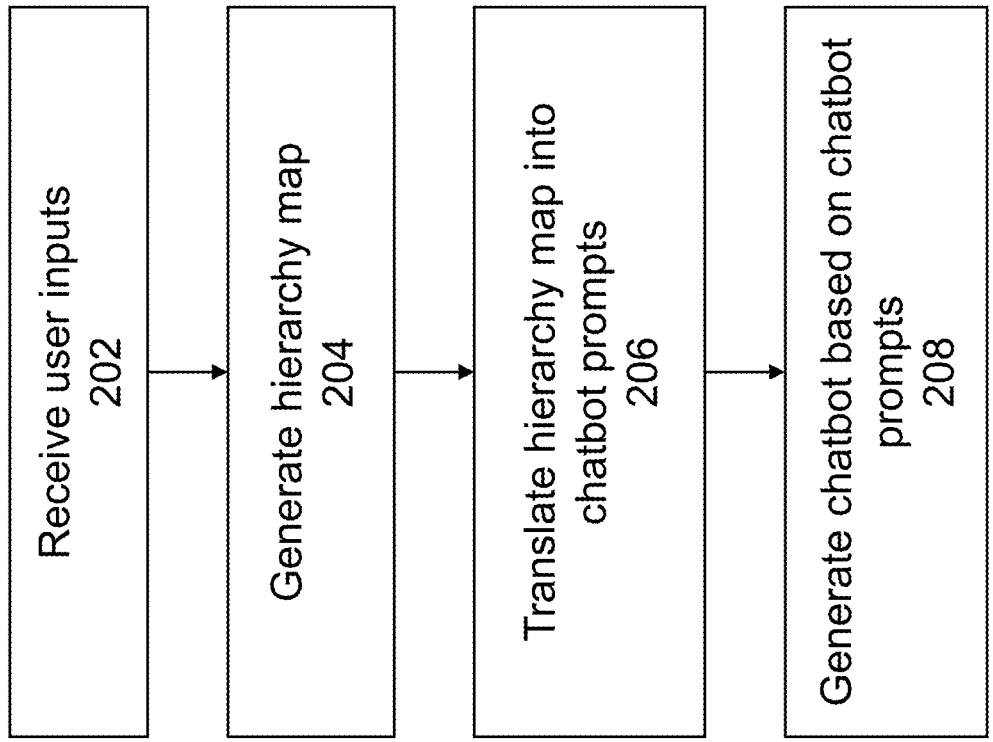
FIG. 2 shows an exemplary method for generating a chatbot, according to one or more examples of the disclosure.

FIG. 2 shows an exemplary method 200 for generating a chatbot, according to one or more examples of the disclosure. In one or more examples, method 200 can be implemented using system 100 of FIG. 1. Method 200 can represent the process performed by the chatbot application 103 to generate a chatbot for presentation to a user via a user device, such user device 102. In one or more examples, method 200 can be performed in real-time.

In one or more examples, method 200 begins at step 202, wherein user inputs are received. User inputs that can be received at step 202 include a selection and/or input of a specific content source, and one or more launch options that designate how/where the user wants the chatbot to be generated. In one or more examples, when receiving user inputs at step 202, method 200 can require the user to provide credentials that identify the user. Method 200 can use these credentials to generate a personalized chatbot for the particular user, as will be discussed below.

Figure 3:
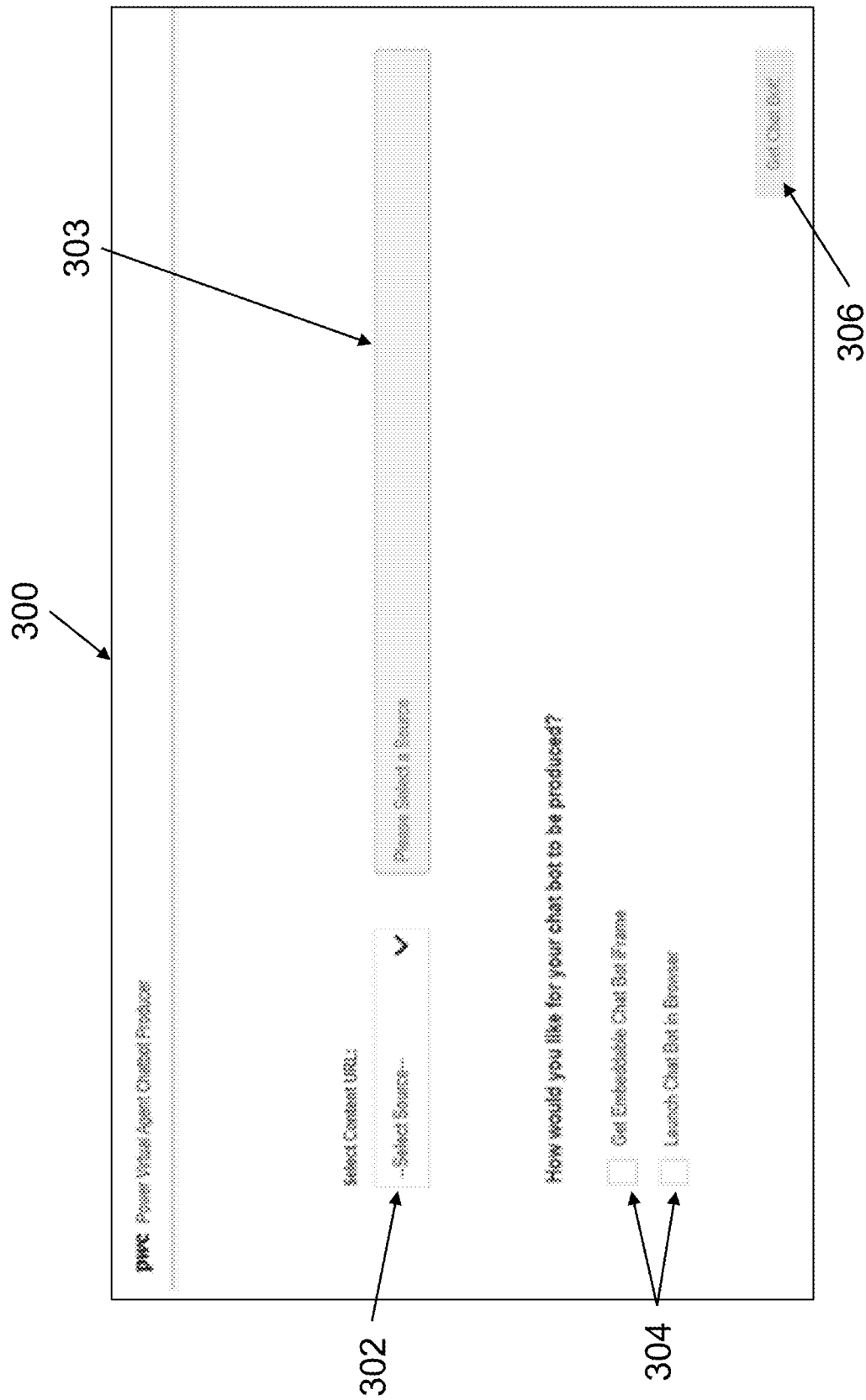
FIG. 3 shows an exemplary user input screen, according to one or more examples of the disclosure.

User inputs can be received from a user interacting with a user interface displayed to the user. An exemplary input screen 300 is shown in FIG. 3, according to one or more examples of the disclosure. In one or more examples, the input screen 300 can be provided to the user via the application interface 104 of FIG. 1 and/or displayed to the user as part of step 202 of method 200.

The input screen 300 can include a number of affordances that enable the user to input information for generating a chatbot. In one or more examples, the input screen 300 can include a selection affordance 302, which enables the user to select a specific content source, a URL field 303, a number of output selection affordances 304, and an execution affordance 306. The selection affordance 302 can be a drop-down affordance that enables the user to select from a number of predetermined content sources, such as SharePoint, Google Drive, Confluence, etc. The URL field 303 can be an editable text field that enables the user to paste or type the exact URL of specific content for which the user wants to generate a chatbot. The output selection affordances 304 are selectable checkboxes that enable the user to specify how/where they want the chatbot to be generated. In one or more examples, the input screen 300 may indicate that a particular output format (for example outputting the chatbot in the browser) is the default format, such as by pre-checking one of the output selection affordances 304. The execution affordance 306 is a selectable button that triggers the generation of the chatbot based on the input options specified using affordances 302, 303, and 304. The affordance types shown in input screen 300 (e.g., the drop-down, editable text field, and selectable checkboxes) are provided for example only, and input screen 300 may include other affordances, such as radio buttons, toggle switches, choice chips, multi-select chips, etc., as appropriate.

Figure 4:
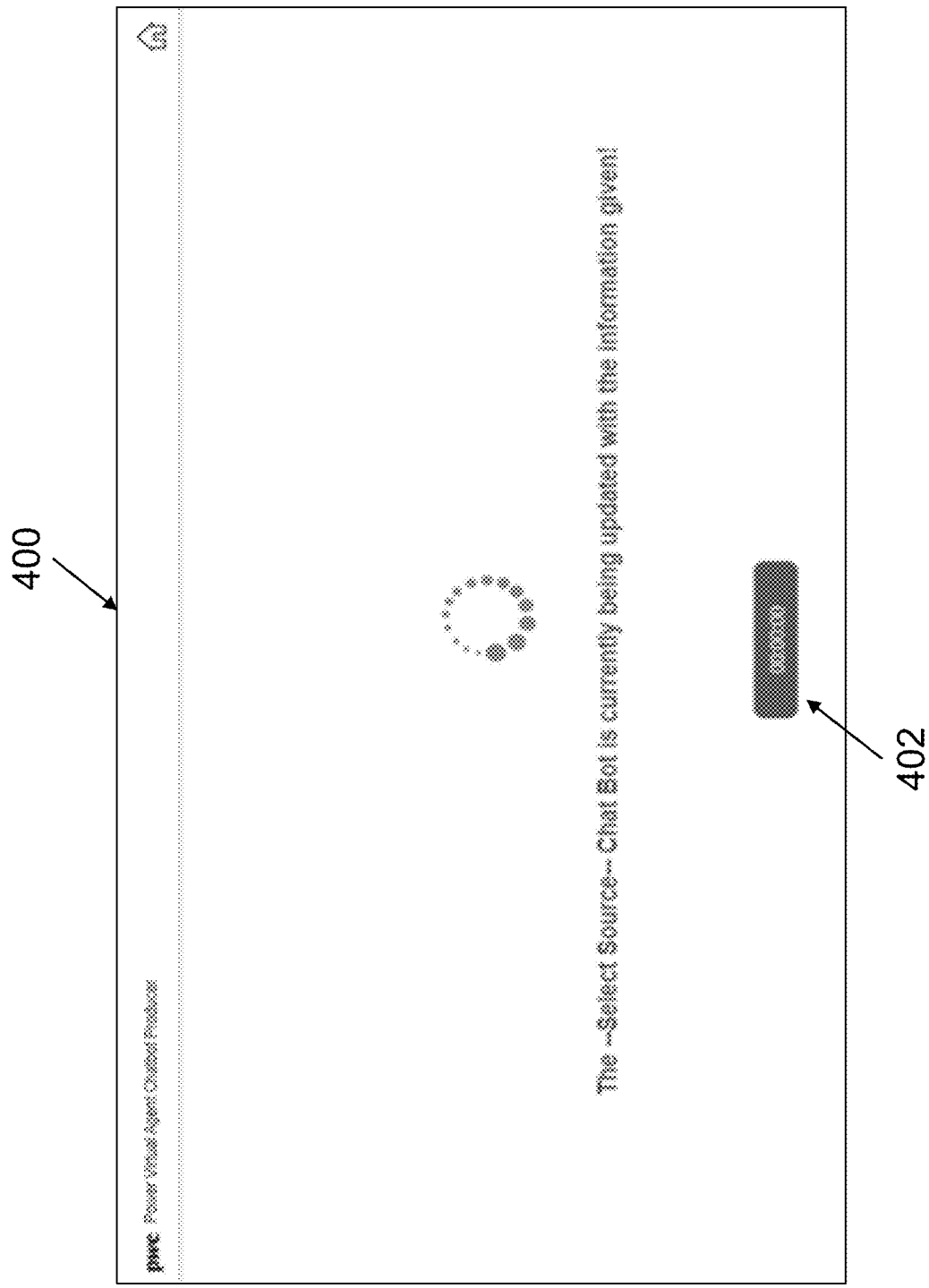
FIG. 4 shows an exemplary intermediate waiting screen, according to one or more examples of the disclosure.

In one or more examples, upon selecting the execution affordance 306, an intermediate waiting screen may be displayed to the user while the chatbot is being generated. An exemplary intermediate waiting screen 400 is shown in FIG. 4, according to one or more examples. The waiting screen 400 can include a timer 402 that displays the time elapsed since the user selected the execution affordance 306. In one or more examples, upon successfully generating the chatbot, the waiting screen 400 may display a notification that indicates the chatbot was successfully generated before, or simultaneously with, launching the chatbot based on the user's launch specifications.

Returning now back to FIG. 2, after receiving user inputs at step 202, method 200 can move to step 204 wherein a hierarchy map is generated. Step 204 can be performed by a specific software module dedicated to generating a hierarchy map, such as the hierarchy file generator 106 of FIG. 1. As used herein, a hierarchy map describes the organizational schema between data features of a given content repository. That is, the hierarchy map describes how data features are related to one another. In one or more examples, generating a hierarchy map at step 204 can include accessing the content repository, identifying the organization schema of the content repository, and mapping the results of the search in a hierarchy map.

As noted above, when accessing a selected content repository, the method 200 may rely on a private key. Thus, generating the hierarchy map at step 204 can include requesting the relevant private key corresponding to the selected content repository from a key vault. Upon accessing the content repository, the content repository can be searched to identify the organizational schema of the repository.

In one or more examples, the user's credentials and identifying information may be considered when accessing the content repository. For example, certain content repositories may have access limitations that stipulate which users can access certain folders or areas of the repository. Thus, the user's credentials may be considered to verify that the user has been granted access to the selected content repository. In one or more examples, credentials provided by the user at step 202 can be used to access a specific file corresponding to the user or to create a file if one does not already exist. In one or more examples, the user-specific file accessed or created can contain shape and connector blobs that can be used to generate the hierarchy map, as will be discussed below. In one or more examples, the user's credentials may be used to personalize the chatbot. For example, the user may have a particular role as identified by their credentials, and the chatbot can be personalized such that the most relevant information, based on the user's role, will be presented to the user first.

In one or more examples, identifying the organizational schema of the repository can include executing a breadth first search (BFS) algorithm to search the tree data structure of the repository. For example, the content repository can be searched sequentially by layer (e.g., search through the layer of parent nodes, search through the entire layer of child nodes, then search through the layer of grandchildren nodes) rather than searching by depth first (e.g., by following one particular lineage from parent to termination at a child or grandchild). Optionally, the content repository can be searched using a depth first search (DFS).

In one or more examples, identifying the organizational schema can include reading the shape and connector data files of the selected content repository, looping through rows of the content repository to specify the shape details (e.g., how the data features are connected) for each row and specifying this information in a shape and connector list, using the shape and connector list to locate the object with the maximum y-location (e.g., the parent node) and setting this object as the root. After locating the root object, all objects that are connected to the root object can be identified by considering the x-location, y-location, height, and width information in the shape and connector list. This process can be performed recursively until reaching a leaf node (e.g., a child node with no further children). After searching the content repository in this manner, the shape and connector list can be updated to specify the desired parent-child structure in a hierarchy map[. In one or more examples, the hierarchy map is saved in the form of a JavaScript Object Notation (JSON) file. An exemplary parent-child structure can include four components: (1) identifying information of the node (such as a string of characters), (2) text associated with the node (such as a folder title), (3) location information of the node (such as a URL), and (4) the parent node of the node (such as the ID of the parent node, or null if the node does not have a parent). The hierarchy map generated can be saved in a content repository (such as SharePoint) and then accessed to generate the chatbot as will be discussed below.

After generating the hierarchy map at step 204, the method 200 can move to step 206 wherein the hierarchy map is translated into chatbot prompts. Step 206 can be performed by a specific software module dedicated to translating the hierarchy map into prompts for a chatbot, such as the chatbot generator 108 of FIG. 1.

As noted above, translating the hierarchy map into prompts for a chatbot can include generating a chatbot decision tree based on the hierarchy map. The chatbot decision tree can include a series of stepwise prompts for navigating through the content repository. As used herein, a decision tree is a tree-like model of decisions (conditional control statements) and possible consequences. The chatbot decision tree can include a series of stepwise prompts (e.g., decision points) for navigating through the content repository, and can provide sequential prompts based on the user's selections (e.g., provide prompts that indicate the consequential path based on the user's decisions). For instance, if a content repository has a first root node A (e.g., a first parent node) with a child node C and a second root node B, the decision tree can include a prompt that requires the user to select node A or node B, and if the user selects node A, may include a prompt that navigates the user to node C.

After translating the hierarchy map into chatbot prompts at step 206, the method 200 can move to step 208 wherein the chatbot is generated based on the chatbot prompts. Step 208 can be performed by a specific software module dedicated to generating the chatbot, such as the chatbot generator 108 of FIG. 1. Generating the chatbot at step 208 can include populating prompts with specific information based on the hierarchy map and/or decision tree. Using the decision tree example above including root nodes A and B, generating the chatbot at step 208 can include populating a first prompt to ask the user whether they want more information regarding node A or node B, and similarly populating subsequent prompts to step through the content repository based on the hierarchy map. After generating the chatbot at step 208, the chatbot can be launched according to the user's launch specifications (or default specifications) and begin providing prompts to the user to navigate them through the content repository.

Figure 5A:
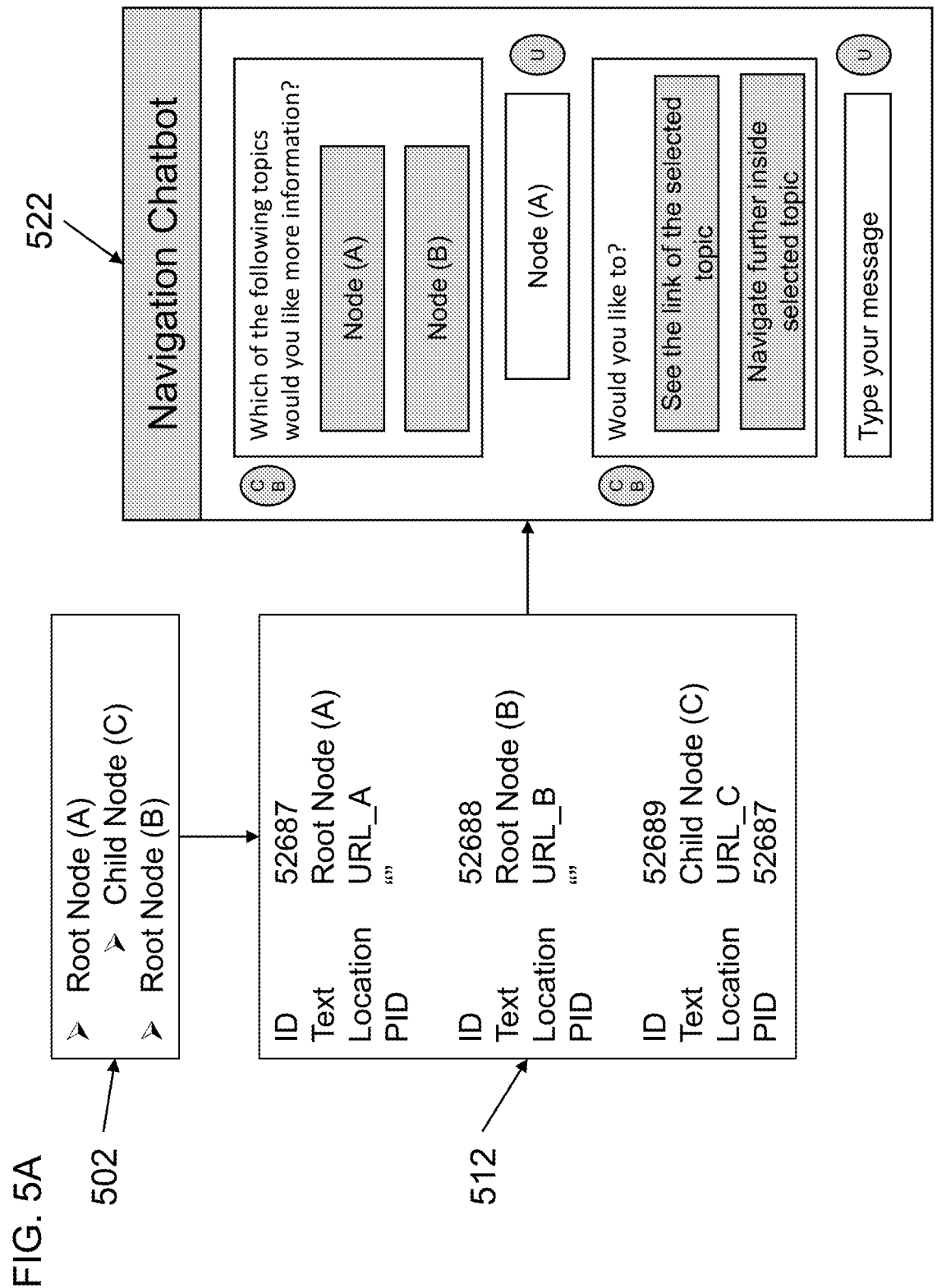
FIG. 5A graphically shows aspects of the creation process of creating an exemplary chatbot, according to one or more examples of the disclosure.
Figure 5B:
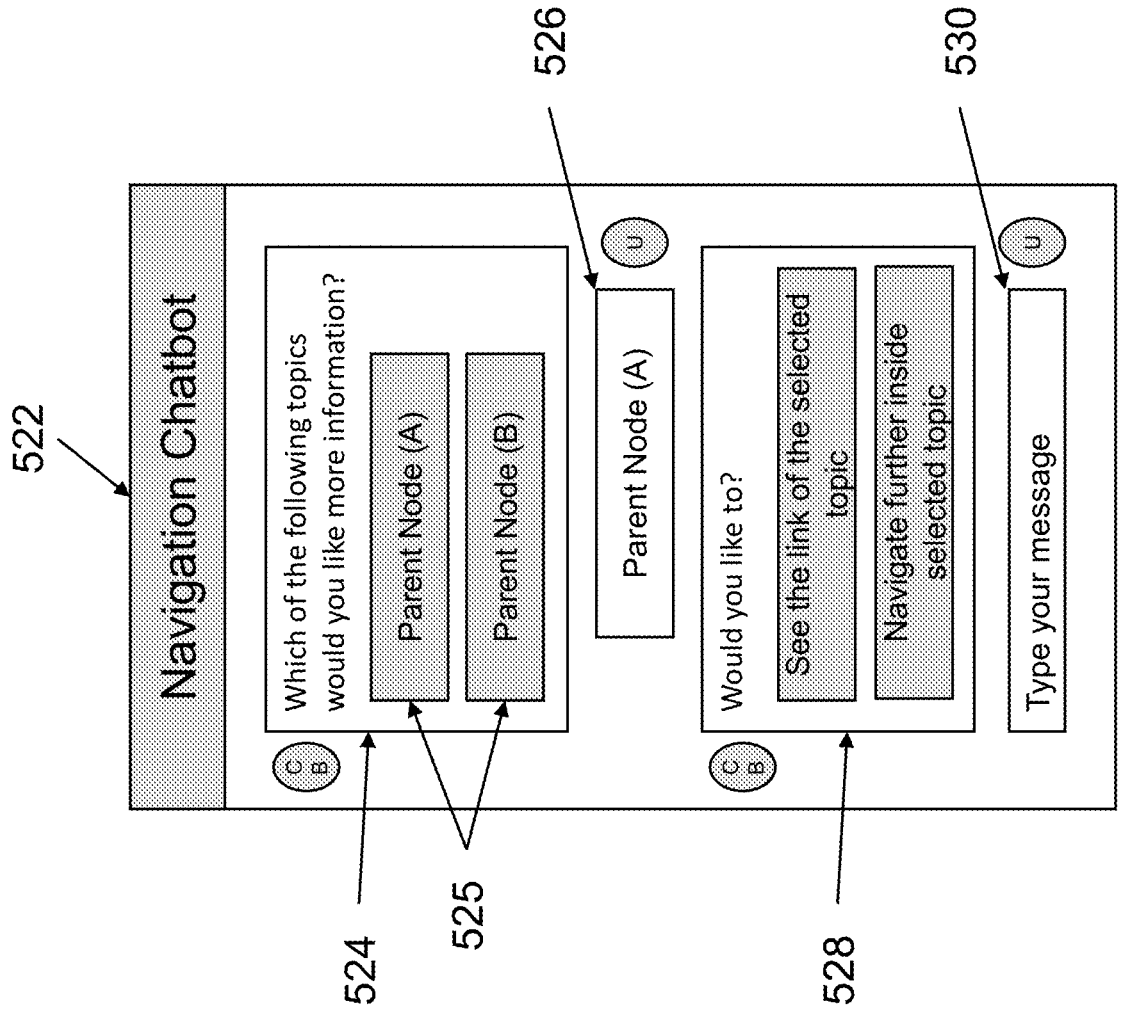
FIG. 5B shows the exemplary chatbot of FIG. 5A, according to one or more examples of the disclosure.

FIG. 5A graphically shows aspects of the creation process of creating an exemplary chatbot, according to one or more examples of the disclosure. More specifically, FIG. 5A depicts a content repository 502, a hierarchy map 512 generated based on the content repository 502, and an exemplary chatbot 522. FIG. 5B shows the exemplary chatbot 522 of FIG. 5A, according to one or more examples of the disclosure.

The content repository 502 includes the exemplary root nodes A and B, and child node C linked to node A. The hierarchy map 512 depicts the information that can be extracted based on the content repository, such as while implementing step 204 of method 200. As shown, the hierarchy map 512 includes the following information for each node: identifying information about the node (ID), text associated with the node, the URL of the node, and identification of the parent node. The chatbot 522 then presents information to the user based on this hierarchy map 512 and content repository 502.

As shown in FIG. 5B, the chatbot 522 includes a first prompt 524 with two options 525. The chatbot 522 depicted here shows that the user has responded to this prompt and selected one of the options 525. The chatbot 522 includes a second prompt 528, which is based on the user's response 526 to the first prompt 524. In this manner, the chatbot 522 can present prompts to the user, with the sequence of prompts dictated by the user's responses, and the hierarchy map of the selected content repository. The user may interact with the chatbot 522 by selecting options 525 presented via the prompts 524, 528. In one or more examples, the user my interact with the chatbot 522 using a text field 530 where the user can type a message. The chatbot 522 may analyze typed messages from the user and use information in the typed messages to present prompts to the user. For instance, if the user types "help" or a variation thereof, the chatbot 522 can present a prompt including information that should be provided upon such input from a user (for instance, providing a prompt for the user to start over entirely, traverse back one step, etc.).

Figure 6A:
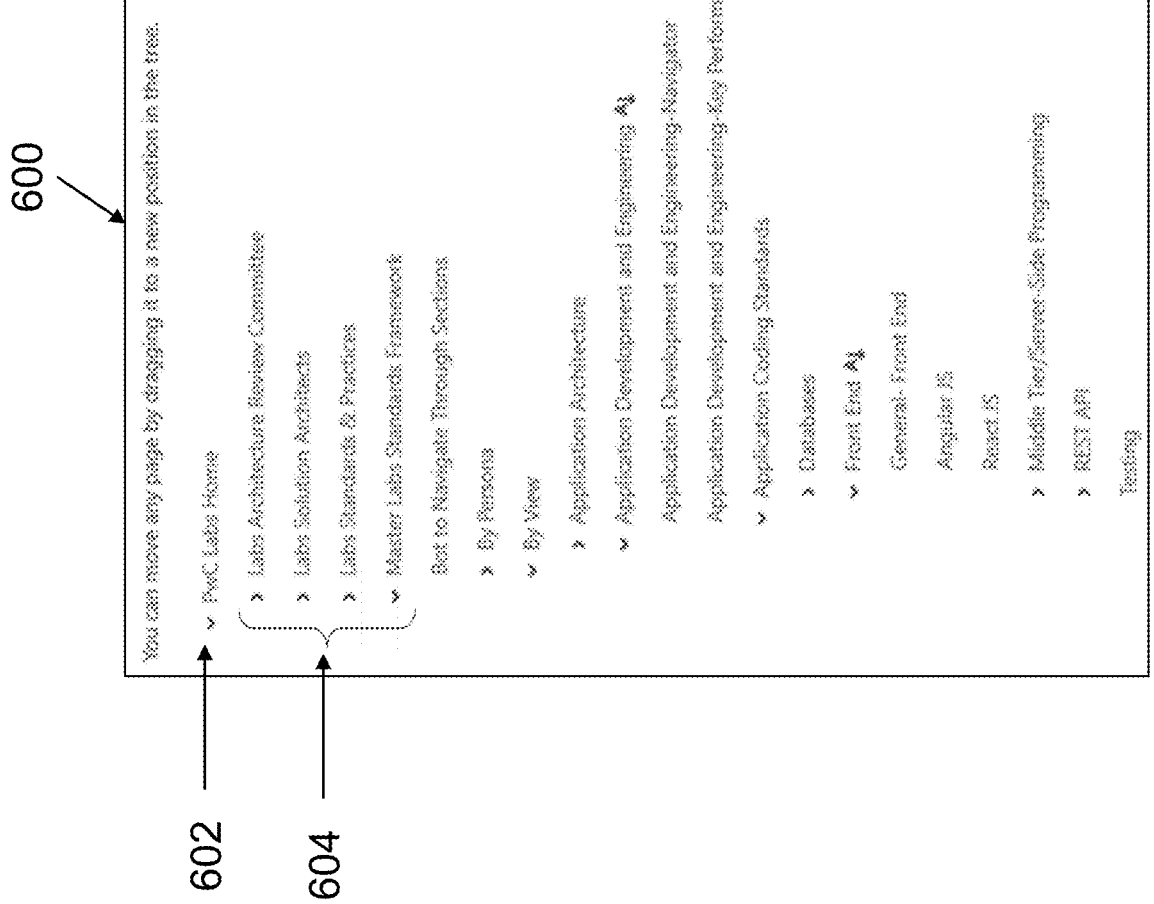
FIG. 6A shows a representation of an exemplary content repository that can be used as an input to dynamically generate a chatbot, according to one or more examples of the disclosure.

The content repository 502 can be an input selected by a user at step 202 of method 200, and can be the information that is used to dynamically generate a chatbot. The content repository 502 is a hierarchical repository that stores information regarding the nodes (root nodes A and B and child node C). Another example of this is shown in FIG. 6A, which shows a representation of an exemplary content repository 600, according to one or more examples. The content repository 600 is a hierarchical repository that stores organization in a number of hierarchical levels. The root node 602 includes a number of child nodes 604, each child node can include further child nodes and so on. A chatbot that is dynamically generated using a hierarchical repository such as this could include stepwise queries based on the hierarchical relationship between the root and child nodes.

Other types of hierarchical content repositories may be used as an input (e.g., used in place of content repository 502) to dynamically generate a chatbot, and the chatbot that is dynamically generated can include stepwise queries based on the hierarchical relationship between the root and child nodes as discussed above. For instance, the content repository can comprise a data tree that includes a collection of objects or entities that are linked together to simulate a hierarchy, with the hierarchical relationships defining the objects/entities as root and child nodes. A chatbot generated using a data tree can include stepwise queries based on these objects/entities and the relationships between them. The content repository can comprise a sectional document, such as a report with headings and sub-headings, with the hierarchical relationship between the headings and sub-headings defining the headings and sub-headings as root and child nodes. A chatbot generated using a sectional document can include stepwise queries based on these headings and sub-headings and the relationships between them.

Figure 6B:
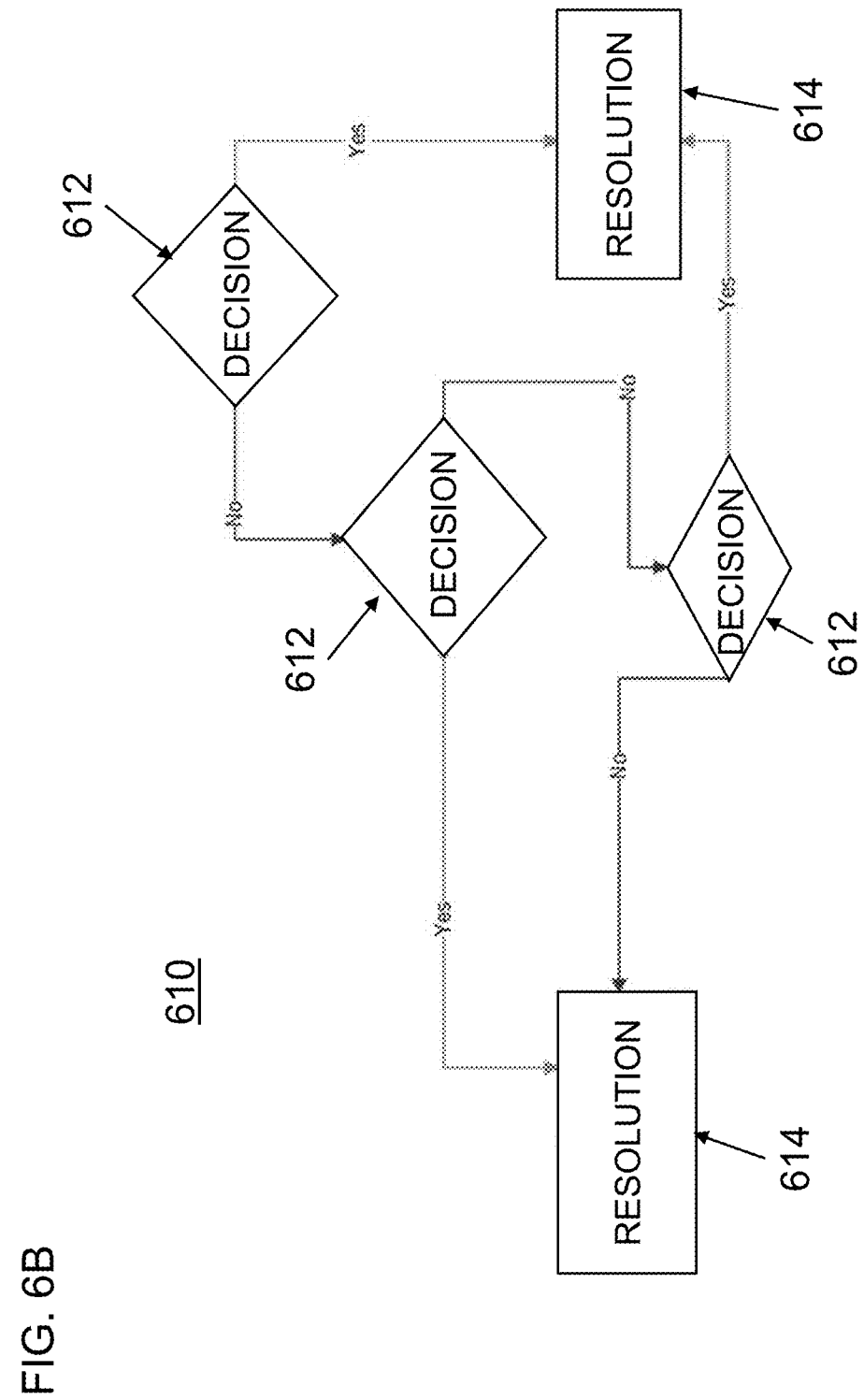
FIG. 6B shows a representation of an exemplary decision tree that can be used as an input to dynamically generate a chatbot, according to one or more examples of the disclosure.
Figure 6C:
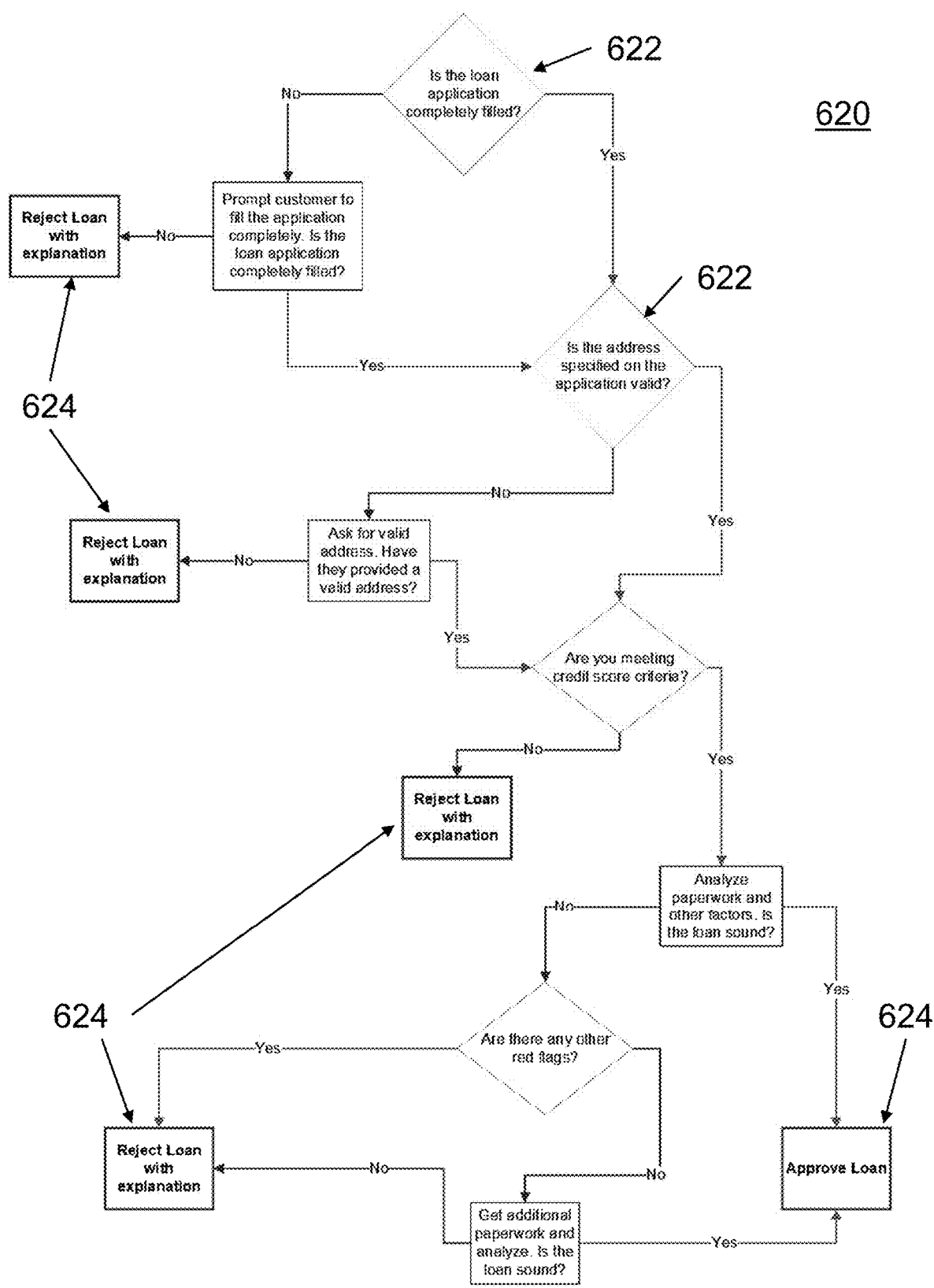
FIG. 6C shows an exemplary decision tree pertaining to approving or rejecting a loan, according to one or more examples of the disclosure.

In addition or alternatively, the content repository can comprise a decision tree that includes a tree-like model of decisions and possible resolutions linked to one another by relationships defining the decisions and resolutions as root and child nodes. An example of this is shown in FIG. 6B, which shows a representation of an exemplary decision tree 610 that can be used as an input to dynamically generate a chatbot as discussed herein. The decision tree 610 includes a number of decisions 612 that are connected to one of another decision 612 or a resolution 614. Another example of this is shown in FIG. 6C, which shows a decision tree 620 pertaining to approving or rejecting a loan. The decision tree 620 includes a number of decisions 622 and a number of resolutions 624. Each resolution 624 is connected to at least one decision 622 by a relationship (e.g., "yes" or "no" in response to the decision), and multiple decisions 622 may be related to one another by a relationship. For example, a first decision (a root node) may ask whether the loan application is complete, with the "no" path leading from this decision to another decision specifying to prompt the customer to complete the application and then reassess whether the loan application is complete (a first child node) and the "yes" path leading from this decision node to another decision node regarding whether the address is valid (a second child node). A chatbot that is dynamically generated using a decision tree such as this could include stepwise queries based on the hierarchical relationship between the decisions and resolutions.

Figure 7:
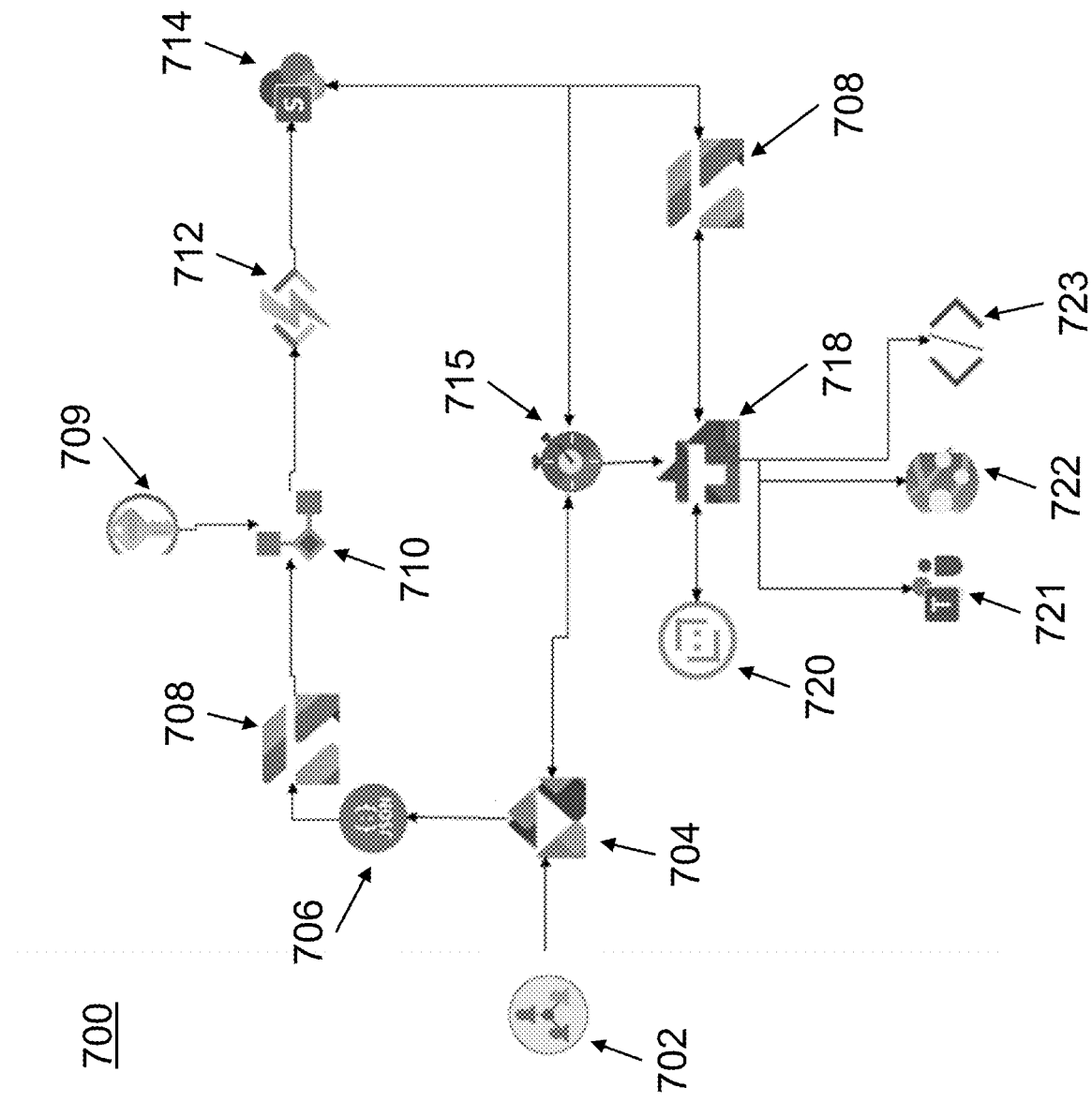
FIG. 7 shows an exemplary architecture diagram of a system for generating a chatbot, according to one or more examples of the disclosure.

FIG. 7 shows an exemplary architecture diagram 700 of a system for generating a chatbot, according to one or more examples. The architecture diagram 700 can represent functions performed by all or some of the components of the system 100 of FIG. 1 and/or described with respect to the method 200 of FIG. 2. The architecture diagram 700 can include a user interface 704 that receives inputs from one or more users 702. As noted above with respect to FIG. 1, the inputs received can include a selection and/or input of a content source and one or more launch options. The content source selected and/or input can be converted to a JSON file via a JSON converter 706. The JSON file generated by the JSON converter 706 can be processed by an automation engine 708 (e.g., Microsoft Power Automate), which may utilize an application programming interface (API) connector 710 to connect to a programming engine 712 (e.g., an Azure Function). The API connector 710 may utilize a secret key 709 specific to the programming engine 712 to access an information repository of the programming engine 712. The programming engine 712 can identify the organizational schema of the JSON file as described above with respect to FIG. 2. The programming engine 712 can identify root nodes and child nodes within the data and generate a parent-child hierarchy (e.g., a hierarchy map) in JSON format for each node of the data. The parent-child hierarchy map can then be saved to a sharing program 714 (e.g., SharePoint). The hierarchy map can be processed by the automation engine 708, which may execute a program 718 to generate a chatbot based on the hierarchy map. The program 718 (e.g., a Power Virtual Agent) can call the automation engine 708 to retrieve the hierarchy map, and then may utilize a framework composer program 720. The framework composer program 720 can intake the output of the hierarchy map and translate that to a series of chatbot prompts, as was described in step 206 of method 200. The chatbot can then be generated based on the chatbot prompts, which may be exported according to the user's inputs. For example, the chatbot may be launched in an application 721 (e.g., Microsoft Teams), launched directly in a browser 722, and/or exported as an embeddable iFrame 723.

Optionally, the system may utilize a timer 715 that queries whether an output has been generated over predetermined time periods. For example, the timer 715 can query the system to determine whether an output has been generated during the predetermined time period, which may begin after the user requests a chatbot be generated (such as by selecting an execution affordance). If the output has not been generated during the predetermined time period, the timer 715 can restart the period and query for the subsequent period. While the chatbot is being generated and no output has been generated, the timer 715 may display a waiting screen (such as waiting screen 400) to the user. If the output has been generated, the timer 715 can return a message indicating the process was successful to the user.

Figure 8:
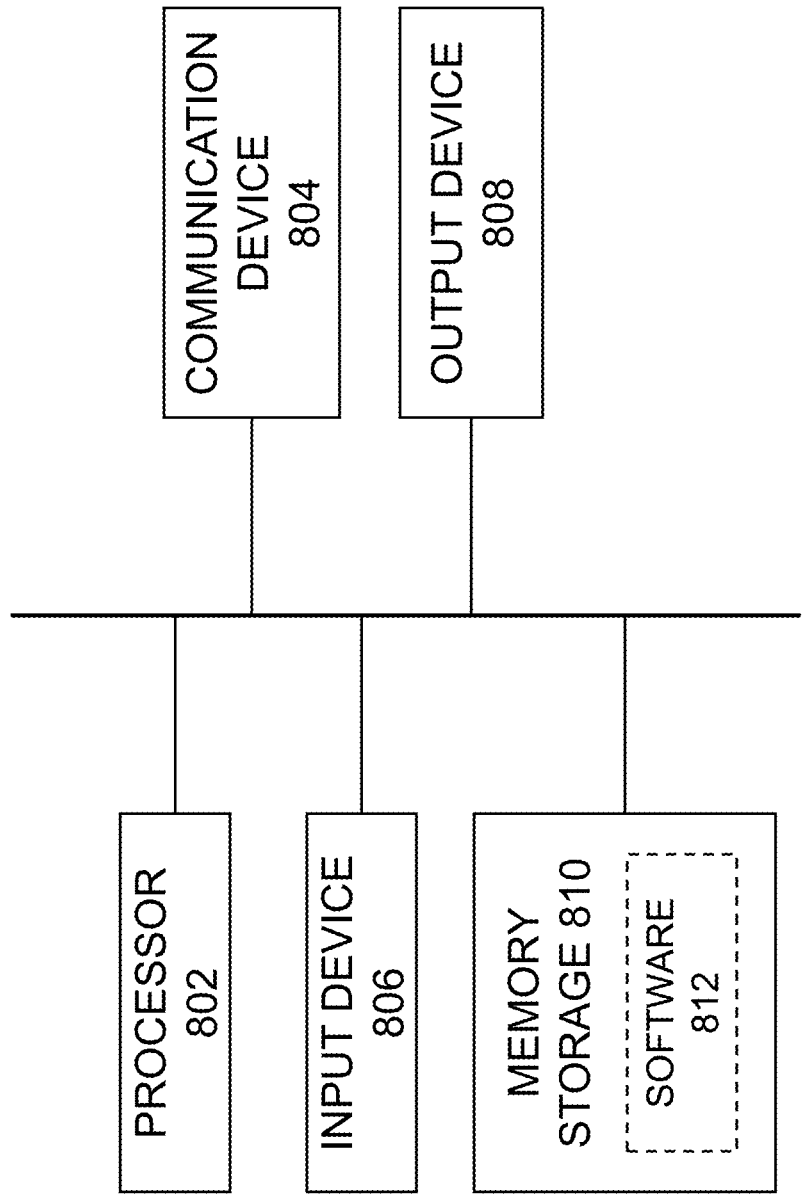
FIG. 8 shows an exemplary computing device, according to one or more examples of the disclosure.

FIG. 8 shows an exemplary computing device 800, according to one or more examples of the disclosure. Device 800 can be a component of a system for generating a chatbot, such as system 100 of FIG. 1. In one or more examples, device 800 is configured to execute a method for generating a chatbot, such as method 200 of FIG. 2.

Device 800 can be a host computer connected to a network. Device 800 can be a client computer or a server. As shown in FIG. 8 device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for generating a chatbot and navigating a content repository using the generated chatbot comprising:
receiving a user selection of the content repository from a user;
accessing the content repository;
extracting organizational data from the content repository;
constructing a hierarchy map of nodes based on the extracted data;
translating the hierarchy map into a chatbot decision tree by identifying decision points in the hierarchy map that require a choice between one or more nodes;
generating a plurality of chatbot prompts based on consequential paths of a user's possible decisions at the decision points in the chatbot decision tree, wherein each of the plurality of chatbot prompts comprise an affordance that enables a user to select a link that directs the user to one or more topics in the content repository;
generating a chatbot based on the plurality of chatbot prompts;
generating a uniform resource locator (URL) that launches the chatbot;
displaying the URL to the user;
receiving a user selection of the URL;
in response to receiving the user selection of the URL, launching the chatbot and displaying one or more of the plurality of chatbot prompts comprising one or more of the affordances associated with the topics in the content repository to the user;
receiving a selection by the user of one or more of the affordances; and
providing content from the content repository to the user, wherein the content is associated with a topic selected based on the user's selection of the one or more of the affordances.

2. The method of claim 1, wherein each of the series of chatbot prompts comprise one or more selectable user input options.

3. The method of claim 2, comprising:
displaying a first chatbot prompt of the series of chatbot prompts to the user via the chatbot;
receiving an input selection, the input selection executed by the user via the one or more selectable user input options; and
displaying a second chatbot prompt of the series of chatbot prompts to the user via the chatbot, the second chatbot prompt based on the input selection.

4. The method of claim 2, wherein the one or more user input options comprise an affordance that enables the user to navigate further within the selected topic.

5. The method of claim 2, wherein the one or more user input options comprise an affordance that enables the user to navigate to a new topic within the content repository.

6. The method of claim 1, wherein generating a hierarchy map comprises:
accessing the selected content repository;
identifying one or more root data nodes;
identifying related child data nodes of each of the one or more root data nodes; and
generating the hierarchy map based on the one or more root data nodes and the related child data nodes of each of the one or more root data nodes.

7. The method of claim 6, wherein the one or more launch options comprise an affordance to launch the chatbot embedded within a website.

8. The method of claim 6, wherein the one or more launch options comprise an affordance to launch the chatbot within an application.

9. The method of claim 1, comprising providing one or more launch options to the user to launch the chatbot.

10. The method of claim 1, wherein the user is a user type of a plurality of user types and the chatbot is generated based in part on the user type of the user.

11. The method of claim 1, wherein the content repository is one of a data tree, a decision tree, and a sectional document.

12. The method of claim 1, comprising displaying a timer to the user while generating the chatbot.

13. A system for generating a chatbot and navigating a content repository using the generated chatbot comprising:
one or more processors coupled to one or more memory devices, wherein the one or more memory devices include instructions that when executed by the one or more processors cause the system to:
receive a user selection of the content repository from a user;
access the content repository;
extract organizational data from the content repository;
construct a hierarchy map of nodes based on the extracted data;

translate the hierarchy map into a chatbot decision tree by identifying decision points in the hierarchy map that require a choice between one or more nodes;

generate a plurality of chatbot prompts based on consequential paths of a user's possible decisions at the decision points in the chatbot decision tree, wherein each of the plurality of chatbot prompts comprise an affordance that enables a user to select a link that directs the user to one or more topics in the content repository;

generate a chatbot based on the plurality of chatbot prompts;

generate a uniform resource locator (URL) that launches the chatbot;

display the URL to the user;

receive a user selection of the URL;

in response to receiving the user selection of the URL, launch the chatbot and display one or more of the plurality of chatbot prompts comprising one or more of the affordances associated with the topics in the content repository to the user;

receive a selection by the user of one or more of the affordances; and provide content from the content repository to the user, wherein the content is associated with a topic selected based on the user's selection of the one or more of the affordances.

14. A non-transitory computer-readable medium that stores instructions that when executed by a computing device, cause the computing device to:

receive a user selection of a content repository from a user;

access the content repository;

extract organizational data from the content repository;

construct a hierarchy map of nodes based on the extracted data;

translate the hierarchy map into a chatbot decision tree by identifying decision points in the hierarchy map that require a choice between one or more nodes;

generate a plurality of chatbot prompts based on consequential paths of a user's possible decisions at the decision points in the chatbot decision tree, wherein each of the plurality of chatbot prompts comprise an affordance that enables a user to select a link that directs the user to one or more topics in the content repository;

generate a chatbot based on the plurality of chatbot prompts;

generate a uniform resource locator (URL) that launches the chatbot;

display the URL to the user;

receive a user selection of the URL;

in response to receiving the user selection of the URL, launch the chatbot and display one or more of the plurality of chatbot prompts comprising one or more of the affordances associated with the topics in the content repository to the user;

receive a selection by the user of one or more of the affordances; and provide content from the content repository to the user, wherein the content is associated with a topic selected based on the user's selection of the one or more of the affordances.

* * * * *